Patented Mar. 16, 1937

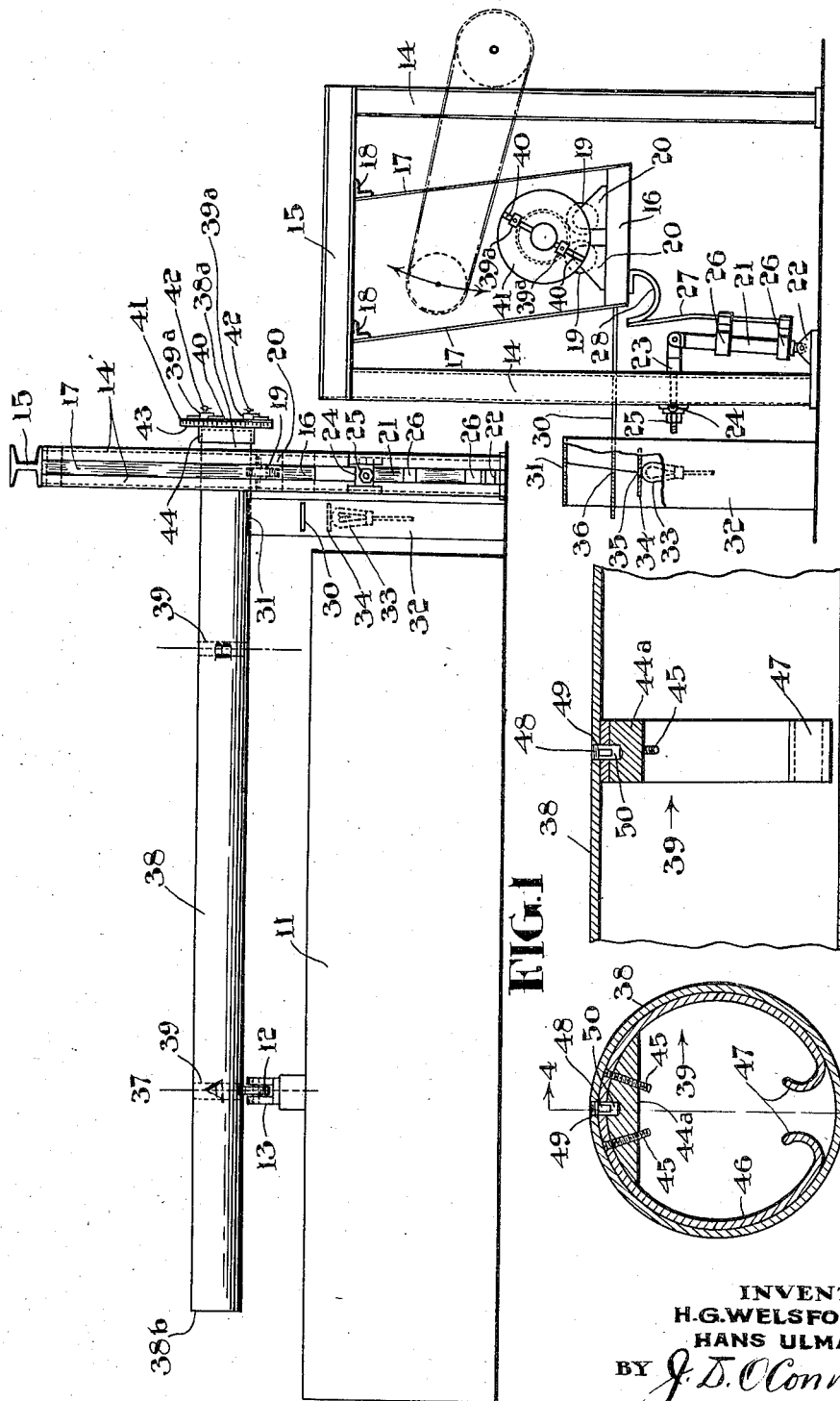

2,074,290

UNITED STATES PATENT OFFICE 2,074,290

BALANCING MACHINE FOR ROTATING BODIES

Hubert G. Welsford and Hans Ulmann, Montreal, Quebec, Canada, assignors to Dominion Engineering Works Limited, Lachine, Quebec, Canada Application May 18, 1932, Serial No. 612,127

5 Claims. (Cl. 73—51)

This invention relates to the balancing of rotating bodies and particularly to the balancing of bodies which have a tendency to whip when rotated at relatively high speeds.

When a condition of static and dynamic unbalance exists in a long roll of small diameter, the roll has a tendency to whip when rotated at high speeds since the moment of inertia is small compared with the length of the roll. This imposes a pulsating effect on the roll bearings and gives rise to troublesome vibration throughout the machine or assembly in which the roll is used. With this in mind the object of the present invention is to provide a simple and efficient apparatus whereby the corrections necessary to proper balancing of such rolls may be readily ascertained and attended to.

The problem of balancing relatively long and flexible tubular bodies, such as long rolls of small diameter, is different from that encountered in connection with the balancing of comparatively rigid bodies. In the latter instance it is usually the object to put all the forces of rotation in balance at the journals or points of support and the balancing planes selected for the application of the correction balance weights may, therefore, be conveniently located at or near said journals or points of support. In the case of relatively long and flexible bodies the out of balance forces are usually due to unequal wall thickness throughout the length of the body and the selection of balancing planes at or near the ends or points of support would be ineffective in preventing whipping of the body due to deflections caused by the out of balance forces between these two planes. For this reason the present invention contemplates, as one of its important features, the application of the correction balance weights at two planes passing through the axis of rotation at such points in the length of the body that when weights of the proper amount are properly placed in the circumference of the body at these two planes they will produce, in the rotating body, a deflection curve similar to the deflection curve produced in the opposite direction by the out of balance forces. The resultant of these two curves is a straight line along the axis of rotation and, consequently, there is no tendency for the body to whip at any speed from zero up to approximately 60% to 70% of its critical speed. By experiment we have determined that the best results are obtained when the two selected balancing planes are so located with reference to the ends of the body that the distance between each plane and the adjacent journal or point of the support is approximately equal to one fourth the length of the body, the exact location of these balancing planes being dependent, of course, upon the length and diameter of the body under investigation.

Another important feature resides in providing a balancing apparatus including an oscillating support for one end of the body arranged so that only a small horizontal component of the weight of the body is caused to bear upon the spring attached to said support to determine its natural period of vibration. This permits the use of a lightly loaded spring of such sensitivity that a very small out of balance force causes the spring to deflect in substantial degree and to oscillate over a wide arc at a low speed of resonance. Consequently, the body under investigation may be balanced at a low speed of rotation and the amplitude of the oscillations easily indicated by any of the well known indicating means usually employed for this purpose. The present invention, therefore, provides a balancing apparatus which is particularly useful in connection with the balancing of any heavy body where the out of balance forces are small relative to the load imposed on the vibrating support by the weight of the body.

A further feature is to provide improved means for securing the correction balancing weights in place when balancing hollow tubular bodies, said means being designed to facilitate attachment of the weights within the body at the balancing planes selected for this purpose.

Proceeding now to a more detailed description reference will be had to the accompanying drawing, wherein—

Fig. 1 is a side view of a balancing apparatus constructed in accordance with this invention.

Fig. 2 is an end view of said apparatus.

Fig. 3 is a transverse sectional view of a hollow roll showing one of the counterbalance weights arranged therein.

Fig. 4 is a longitudinal sectional view taken along the line 4—4 of Fig. 3.

Referring more particularly to the drawing, 11 designates a stationary base equipped with rollers 12 journalled in suitable brackets 13, only one roller 12 being shown in Fig. 1 since the companion roller, being in direct line therewith, is hidden from view. A frame structure comprising uprights 14 and a top cross bar 15 is arranged at one end of the base 11 and serves to support an oscillatable base 16. Base 16 is carried by the lower ends of a pair of inclined flexible metal straps 17 having their upper ends secured to the cross bar 15 by angle brackets 18 or other suitable means. Rollers 19, corresponding to the rollers 12, are journalled in suitable brackets 20 carried by the base 16.

An adjustable spring device is associated with the oscillating base 16 for a purpose to be hereinafter described. This device includes a standard 21 having its lower end pivoted to a supporting bracket 22 and its upper end pivoted to one extremity of an adjusting bolt 23. The bolt 23 passes through a pivotally mounted fitting 24 on one of the uprights 14 and is equipped with an adjusting nut 25. A pair of vertically adjustable clamps 26 are slidably mounted on the standard 21 and carry a spring strip 27 having a curved or U-shaped upper portion 28 fastened to the base 16.

An oscillation magnifying apparatus is also associated with the base 16. This apparatus includes a movable plate 30 having one end fixed to move with the base 16 and the other end free to move back and forth beneath a ground glass plate 31 forming the top wall of a lamp enclosing frame 32. A lamp 33 is mounted in the frame 32 directly below an opaque member 34 having a slot 35 through which a beam of light is projected onto the lower surface of the movable plate 30 which is provided with a similar slot 36. As the plate 30 oscillates with the base 16 the movement of the slot 36 with reference to the slot 35 produces the effect of a beam or strip of light traversing the glass plate 31 which diffuses the light beam and makes it visible. By adjusting the distance between the plate 30 and the opaque member 34 the magnifying ratio of the oscillation magnifying device may be altered to suit variations in the maximum oscillation of the base 16 as controlled by the different lengths and weights of the bodies to be tested.

The rotating body to be tested appears at 38 in the form of a long roll of relatively small diameter. This roll is supported adjacent one end by the rollers 12 and at the other end by the rollers 19. The rollers 12 are positioned to mount the roll for horizontal oscillation about a vertical axis 37 which is perpendicular to the axis of rotation and is spaced from the adjacent end of the roll a distance corresponding, approximately, to one fourth the length of the roll. This positioning of the point of support afforded by the rolls 12 corresponds to what has been found by experiment to be the most suitable longitudinal position of the balance weights 39 on a long roll of unequal wall thickness throughout its length, but may be varied somewhat according to the relative length and diameter of the roll. With the balance weights 39 in this location the deflections of the roll due to the centrifugal forces resulting from the unbalanced masses of the roll and the presence of the balance weights offset each other most favorably. In other words this location of the balance weights 39 represents the most desirable point for introducing an artificial unbalance to maintain equilibrium with the unbalance to be corrected. If the balance weights were placed at or immediately adjacent the extreme ends of the roll they would not take care of the whip of the roll in a satisfactory manner since they would then have little or no effect on the roll with respect to bending moments and deflection.

During the testing operation the roll is rotated in contact with the rollers 12 and 19 and is free to oscillate in a more or less horizontal plane about the vertical axis 37 which coincides with the point of support afforded by the rollers 12 and is perpendicular to the axis of rotation. The roll, together with the supporting rollers 19, the oscillating base 16 and the springs 27 may be said to constitute an oscillating system of a certain frequency. If the roll is rotating by its own momentum it gradually drifts through a speed at which the unbalanced centrifugal forces in the roll are in resonance with the oscillating system so that the oscillations increase to the maximum, this being the balancing or synchronizing speed at which balancing observations are made. With further slowing down of the roll the oscillation decreases and dies down to a minimum.

In order to determine the corrections necessary to proper balancing of the rolls auxiliary weights 39a are adjusted on the end 38a of the roll until the oscillation ceases when the roll is passing through the balancing or synchronizing speed. In the present instance two weights 39a are mounted to slide along suitable radial guides 40 carried by a disk 41, said weights being held in different positions of adjustment by means of set screws 42. The disk 41 is turnably mounted on a second disk 43 which is supported on the end 38a of the roll 38 by means of a collar 44. This arrangement permits turning of the disk 41 to vary the angular displacement of the weights 39a with respect to the roll 38 and it also enables the weights to be adjusted radially with respect to the axis of the roll. From the position and known counterbalancing effect of the adjusted weights 39a the number of inch pounds which the roll is out of balance with respect to the axis 37 and the weights 39 may be readily ascertained so that simple calculations with moments about the axis 37 will indicate the amount and location of the necessary weight corrections.

The oscillation characterizing the foregoing balancing operation is magnified and rendered visible by the previously described oscillation magnifying apparatus, the principal feature of which is substantially frictionless functioning.

One method of attaching the balancing weights 39 to the roll 38 is illustrated in Figs. 3 and 4. The weight proper is indicated at 44a and comprises a body of lead or other suitable material secured by studs 45 to a holder 46, said holder being in the form of a split ring adapted to expand against the inner surface of the roll with sufficient pressure to retain its position therein. The ends of the holder are curved inwardly to provide extensions 47 adapted to be clamped between the jaws of a pair of tongs in order to contract with the holder so that it may be conveniently positioned within the roll. Creeping of the holder with reference to the roll is prevented by means of a locking pin 48. This pin passes through an opening 49 in the roll 38 and has its inner end received in a socket 50 formed partly in the holder 46 and partly in the body 44a. The angular and longitudinal position of the opening 49 is predetermined to insure correct location of the weight 39.

The axis of oscillation indicated at 37 coincides with the balancing planes A and B at which the correction balance weights 39 are applied to the roll during the balancing operation. After the necessary weight corrections to be made at point B have been determined by computation following adjustment of the weights 39a the roll is turned end for end so that the plane B replaces the point A which now occupies the position formerly occupied by plane B. The disks 41 and 43 together with the weights 39a are then transferred to the roll end 38b and the previously mentioned weight adjustments and computations repeated to determine the weight corrections to be made at point A. In this way the corrections necessary to take care of conditions of static and dynamic unbalance are readily ascertained in a very simple and efficient manner. The balance weight applied to the roll at the axis of oscillation gives no moment about this axis and consequently does not affect the weight corrections to be determined by adjustments of the weights 39a on that end of the roll supported by the oscillating base 16 so the balancing problem is materially simplified.

With reference to the spring device associated with the base 16 it will be noted that the base is offset by the inclination of the spring supports 17 so that only a small component of the weight is imposed on the base holding spring strip 27 during oscillation of the base. This provides for a low speed of resonance in the balancing operation since it permits use of a comparatively weak spring for balancing the weight of the roll against the out of balance forces. It also eliminates the necessity of balancing the roll at its normal operating speed since it permits any other speed to be effectively employed for this purpose.

The mounting of the spring strip 27 so that it may be adjusted on the standard 21 to vary the effective length of the spring device provides a means whereby the speed of resonance of the oscillating system may be adjusted to suit variations in the length and weight of the rolls or bodies under test. Adjustment of the standard 21 by means of the adjusting bolt 23 is resorted to to regulate the compression of the spring strip 27 and to correct any misalignment of the supporting rollers 12 and 19 which would result in creeping of the roll.

In the foregoing we have described what we now conceive to be the preferred embodiment of our invention but it will be understood that various changes in the construction and arrangement of parts may be resorted to within the scope and spirit of the appended claims.

Having thus described our invention, what we claim is:

1. Balancing apparatus comprising a pair of spaced supports on which the body to be balanced is rotatably mounted during the balancing operation, one of said supports being fixed to establish a vertical axis of oscillation about which the companion support is free to oscillate in a substantially horizontal plane, said companion support comprising a base and a pair of inclined flexible straps suspending the base from overhead points of suspension, and lightly loaded spring means attached to said base to determine its natural period of vibration, said spring means being arranged so that only a small horizontal component of the total weight of the body is imposed thereon during the balancing operation.

2. Balancing apparatus as claimed in claim 1 in which the last mentioned spring means includes adjustable means to vary the inclination of said straps.

3. Balancing apparatus comprising a fixed support, a movable support adapted to oscillate in a substantially horizontal plane about a vertical axis of oscillation located at the fixed support, said movable support including a base and a pair of inclined straps suspending said base from overhead points of suspension, a spring strip having its upper end attached to one side of said base, and supporting and adjusting means attached to the lower portion of said spring at a point below said base.

4. Balancing apparatus comprising a pair of supports on which the body to be balanced rotates during the balancing operation, a stationary base mounting one of said supports, an upright frame arranged at one end of said stationary base, a pair of inclined flexible straps suspended from the upper portion of said frame, a movable base carried between the lower end of said straps and mounting the remaining support for the body to be balanced and a spring connected to the movable base to determine its natural period of vibration and arranged so that only a small horizontal component of the total weight of the body is imposed on the spring during the balancing operation.

5. Apparatus for balancing rotary bodies comprising oscillatable means for supporting one end of the body during the balancing operation, said means comprising a frame including uprights and a horizontal top member secured to said uprights, a pair of spring strips having their upper ends fastened to said top member, a base carried between the lower ends of said strips, a bearing for the rotary body mounted on said base, a standard having its lower end pivotally mounted adjacent one of said uprights and its upper end adjustably secured to said upright and a vertically disposed spring strip secured to said standard at points below its upper end, the upper end of said spring strip being attached to said base.

HUBERT G. WELSFORD.
HANS ULMANN.